Oct. 6, 1970   G. L. ANDERSON   3,532,382
DUMP BOX
Filed Sept. 3, 1968   2 Sheets-Sheet 1
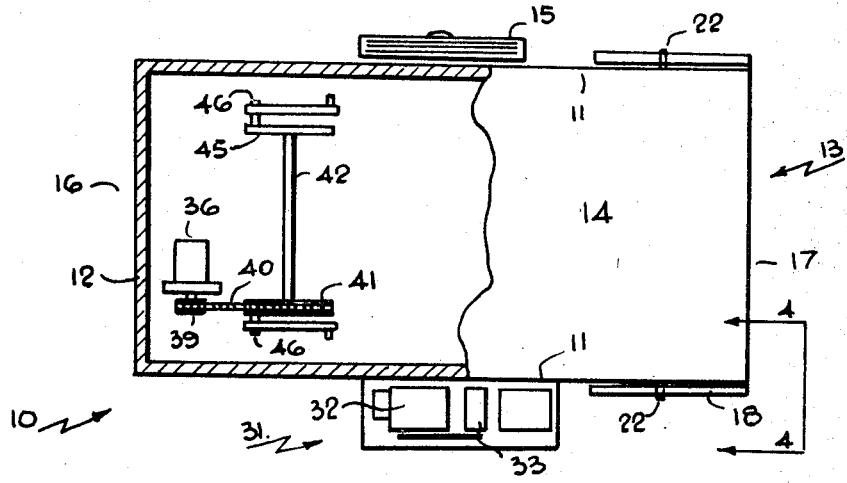
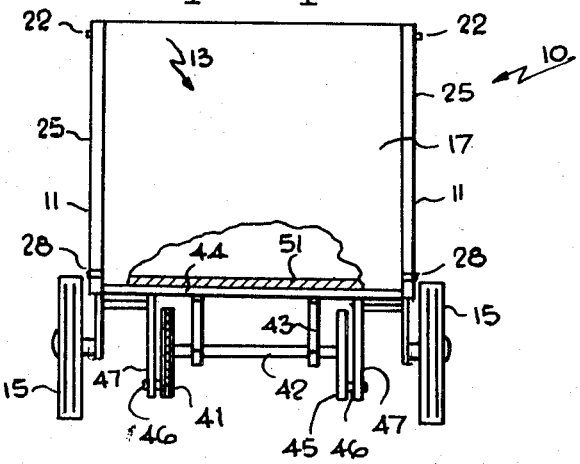
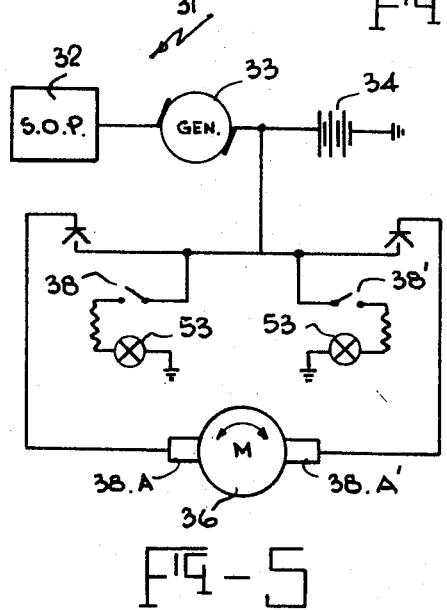
INVENTOR
GORDON L. ANDERSON
BY
Kent & Ade
ATTORNEY Oct. 6, 1970     G. L. ANDERSON     3,532,382
DUMP BOX Filed Sept. 3, 1968                                2 Sheets-Sheet 2

INVENTOR
GORDON L. ANDERSON

BY

ATTORNEY

United States Patent Office 3,532,382
Patented Oct. 6, 1970

3,532,382
DUMP BOX
Gordon L. Anderson, Raymond, Alberta, Canada, assignor to Flexa-Hopper (1968) Ltd., Welling, Alberta, Canada
Filed Sept. 3, 1968, Ser. No. 757,072
Int. Cl. B60p 1/56
U.S. Cl. 298—26                    5 Claims

ABSTRACT OF THE DISCLOSURE

A dump box for chaff and the like having a dump floor operable by an electric motor through crank arms which go over center in both the closed and open positions thus providing a means for locking the floor in position against movement. Operation of the floor also, through linkage, opens and closes a rear tail gate to the box.

This invention relates to new and useful improvements in dump boxes, and although directed primarily to chaff boxes, nevertheless it will be appreciated that it could be used for other products.

It is conventional to transfer the chaff from a combine or the like to a box pulled behind the combine thus collecting the chaff for dumping in piles or for transference to other locations.

A conventional dump box of this type is provided with a tilting floor interconnected with linkage to a tail gate and designed so that when the box is full, a trip rope is pulled by the operator thus permitting the weight of the chaff to tilt the floor rearwardly and at the same time lift the tail gate so that the chaff is deposited on the ground behind the box. When in the full open position, a latch is engaged thus holding the weight of the tail gate upwardly and this latch has to be tripped after the box has been dumped thus allowing the weight of the tail gate to close same and elevate the floor to the closed position.

This suffers from several disadvantages among which is the fact that two trip mechanisms and two ropes are required, which often tangle and break when turning corners. More importantly, it is impossible to dump a partial load if the weight of this load is not sufficient to operate the mechanism and this can be inconvenient as will be imagined.

I overcome all of these disadvantages by utilizing a tilting floor interconnected with a tail gate but operating same through an electric motor which is reversible and which is connected to the floor by means of crank arms so that the opening and closing is positive and can be accomplished irrespective of the load contained within the box. Furthermore, I include over center means so that the floor is held firmly in both the opening and closed position so that no bounce occurs if travelling over rough ground.

In the present embodiment I prefer to use an electric motor as a source of power operated from a small gasoline motor but, of course, any convenient source of power can be utilized, including power takeoff from the towing vehicle.

With the foregoing considerations in view, and such other objects, purposes or advantages as may become apparent from consideration of this disclosure and specification, the present invention consists of the inventive concept exhibited in the method, process, construction, arrangement of parts, or new use of any of the foregoing herein particularly exemplified in one or more specific embodiments of such concept, reference being had to the accompanying figures in which:

FIG. 1 is a top plan view of my box with the floor partially cut away.

FIG. 2 is a rear end view of the box with the tail gate partially cut away.

FIG. 5 is a schematic showing the connection between the source of power and the motor.

FIG. 6 is a fragmentary rear corner view of the box substantially along the line 4—4 of FIG. 1.

In the drawings like characters of reference indicate corresponding parts in the different figures.

Figure 3:
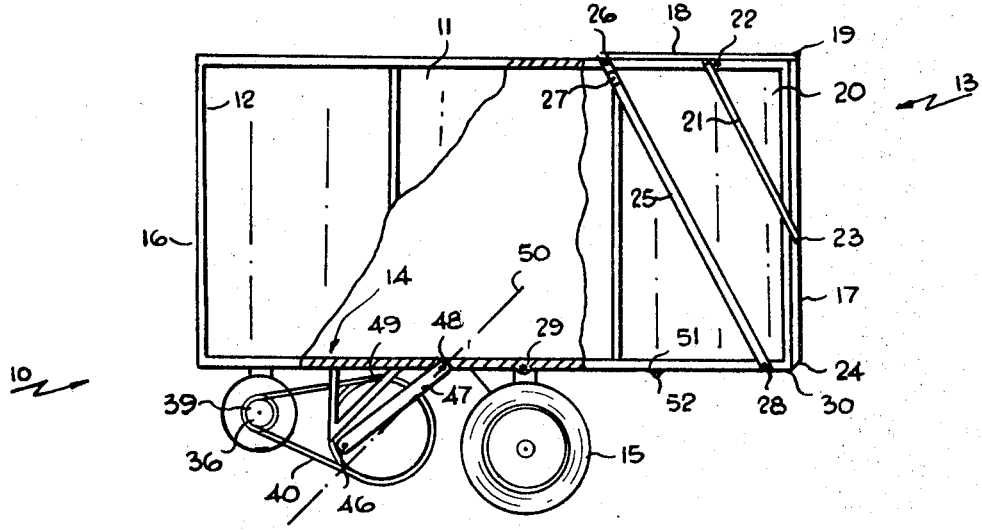
FIG. 3 is a side view of the box with one side partially cut away to show the interior thereof, and showing the floor in the closed position.

Proceeding therefore to describe the invention in detail, reference should be made to the accompanying drawings in which 10 illustrates generally the dump box comprising a pair of sides 11, a front wall 12, a tail gate collectively designated 13, and a dump floor collectively designated 14. These are built upon conventional framework (not illustrated). The dump box is supported upon a pair of ground engaging wheels 15 one upon each side thereof and slightly towards the forward end 16 of the box by which it is normally connected to the towing vehicle by any conventional method.

The tail gate 13 consists of a substantially rectangular panel 17 having a pair of upper arms 18 extending forwardly from upper edge 19 thereof and upon each side.

The arms 18 are pivoted to the sides 11 of the box adjacent the upper rear corners 20 thereof.

Brace arms 21 extend from the upper arms 18 just forward of the pivot pins 22, to a point 23 spaced from the lower edge 24 of the tail gate 17. This mounting allows the tail gate to be in the closed position shown in FIG. 3 or in the dump position shown in FIG. 4.

Actuating arms 25 are pivotally connected by the upper ends thereof to the forward ends 26 of the upper arms 18, said actuating arms being provided with conventional adjustors 27 adjacent one end thereof. Arms 25 extend downwardly and are pivotally connected as at 28 to each side of the tilting floor 14 which is a substantially rectangular panel within the base of the box and pivoted to the sides by means of side pivot pins 29.

Figure 4:
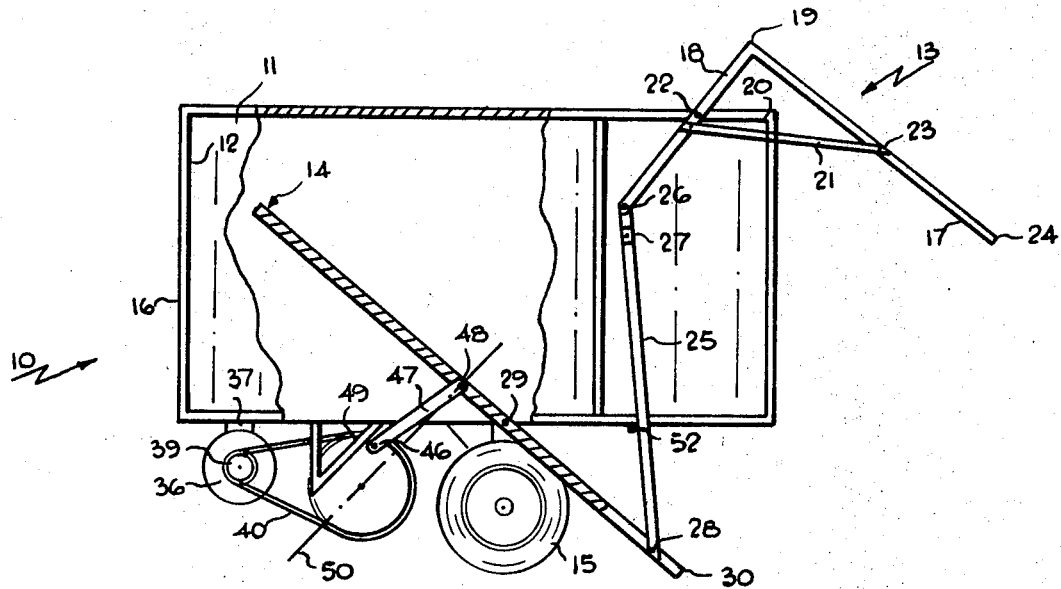
FIG. 4 is a view similar to FIG. 3 but showing the floor in the open position.

This pivot point is slightly towards the rear end 30 of the floor. It will therefore be appreciated that tilting of the floor from the closed position as shown in FIG. 3 to the dump position as shown in FIG. 4 will at the same time open the tail gate 13 and vice versa.

Means to actuate the dump floor 14 are provided and in this embodiment take the form of a source of power collectively designated 31. This comprises a gasoline engine 32 driving a generator 33 which in turn is connected to a battery 34. This battery is connected by conventional electrical conduits 35, to a reversing electric motor 36 carried under the frame upon support brackets 37. Switch assemblies 38 and 38' are provided adjacent the operator so that he can cause the motor 36 to rotate in either direction as desired. These switches actuate the motor solenoids 38A and 38A' respectively.

A sprocket 39 is connected to the motor and a chain 40 extends around this sprocket and around a relatively large sprocket 41 secured to an axle 42 in turn supported from hangers 43 upon the underside framework 44 of the box.

A wheel or crank arm 45 is secured to the opposite end of axle 42 and crank pins 46 are secured to and extend outwardly from adjacent the periphery of both the sprocket 41 and the wheel 45. Crank arms 47 extend between the crank pins 46 and a point of pivotal connection 48 on each side of the tilting floor panel 41 and forwardly of the pivots 29.

Rotation of sprocket 41 by the motor 36 will therefore cause the crank pins to rotate thus actuating the floor around the floor pivots 29 from the position shown in FIG. 3 to the position shown in FIG. 4, and vice versa, when the motor is reversed.

Stop arms 49 extend downwardly from the frame of the box forwardly of the axle 42 and are engaged by extensions of crank pins 46 when the floor is in the closed position as shown in FIG. 3 and again when the floor is in the fully open or dump position as shown in FIG. 4. In both instances it will be noted that the crank pin 46 has passed over dead center indicated by the dotted line 50.

In conjunction with this over center action I provide stops to limit the travel of the floor in both the closed and dump positions.

Dealing firstly with the closed position as shown in FIG. 3, reference should be made to FIG. 4 in which pivot pin 28 engages the side base 51 of the side 11 and this engagement is just prior to the crank arm passing over dead center to the position shown in FIG. 3. This means that the crank arm and floor are under tension as they pass over the dead center line 50 thus locking the mechanism in this position and preventing any bounce or unnecessary movement of the floor from occurring.

A stop bar 52 is secured to the lower edge 51 of the side panels between the floor pivot points 29 and the pivots 28. These pins extend outwardly from the sides so that they are engaged by actuating link arms 25 as the tail gate reaches the open position shown in FIG. 4. This engagement occurs just prior to the crank arm reaching the dead center line 50 thus placing the crank arm 47 and the floor in compression so that when the crank pin does pass over the dead center line 50 to the position shown in FIG. 4, this compression maintains the floor in the open position without bounce of inadvertent movement occurring.

It is desirable, of course, to provide micro-switches 53 and 53′ in circuit between the battery 34 and solenoids 38A and 38A′ and actuated by the linkage or crank arms when same pass over the dead center position to the fully closed or fully dumped position. However, these are only shown in schematic view in FIG. 5 and are not illustrated in the rest of the drawings. These micro-switches 53 control the primary current to the solenoids operating the electric motor 36.

From the foregoing, it will be seen that the dumping mechanism is fully flexible to suit varying conditions and can be operated completely independently of the load within the box and without the necessity for trips and trip ropes.

Various modifications can be made within the scope of the inventive concept disclosed. Accordingly, it is intended that what is described herein should be regarded as illustrative of such concept and not for the purpose of limiting protection to any particular embodiment thereof, but that only such limitations should be placed upon the scope of protection to which the inventor hereof is entitled, as justice dictates.

What is claimed to be the present invention is:

1. In a dump box including side walls, a front wall, and a rear tail gate pivoted to the sides of the box adjacent the upper rear corners thereof; a floor pivoted to the sides of the box at the lower edges thereof and intermediate the ends of said floor, said floor being movable around said pivots from a closed, substantially horizontal position to a dump position, means to move said floor as aforesaid, said means including a source of power, and linkage means operatively connected between said floor and said source of power to move said floor, and means to hold said floor against inadvertent movement in both the closed and dump positions, said linkage means operatively connecting said floor to said source of power including a crank arm, a crank pin rotated by said source of power, said crank arm being connected at one end thereof to said crank pin and by the other end thereof to said floor forwardly of said pivots, said source of power being selectively reversible in direction of rotation.

2. The device according to claim 1 in which said means to hold said floor against inadvertent movement includes means whereby said crank arm passes over center when said floor is in the fully open or fully closed positions and means limiting said over center movement.

3. The device according to claim 2 in which said means to limit said over center movement includes a stop arm extending from said box, said crank pin extending beyond said crank arm and engaging said stop arm in the floor closed and floor dumping positions.

4. The device according to claim 2 which includes stop means limiting the fully open and fully dump positions of said floor and being engaged prior to said crank arm passing over dead center thereby compressing said crank arm in the floor closed position and tensioning said crank arm in the floor dump position thus holding said floor against said inadvertent movement.

5. The device according to claim 3 which includes stop means limiting the fully open and fully dump positions of said floor and being engaged prior to said crank arm passing over dead center thereby compressing said crank arm in the floor closed position and tensioning said crank arm in the floor dump position thus holding said floor against said inadvertent movement.

References Cited

UNITED STATES PATENTS

| | | | |
|---|---|---|---|
| 1,897,175 | 2/1933 | Meyer | 296—26 |
| 2,605,915 | 8/1952 | Day | 298—26 X |
| 3,034,832 | 5/1962 | Barrington | 298—26 |
| 3,351,384 | 11/1967 | Huck | 298—26 |

RICHARD J. JOHNSON, Primary Examiner